Oct. 26, 1948.  O. G. VOGEL ET AL  2,452,214
CLAMP-ON ELECTRIC HEATER FOR WATER TANKS AND THE LIKE
Filed Nov. 19, 1945
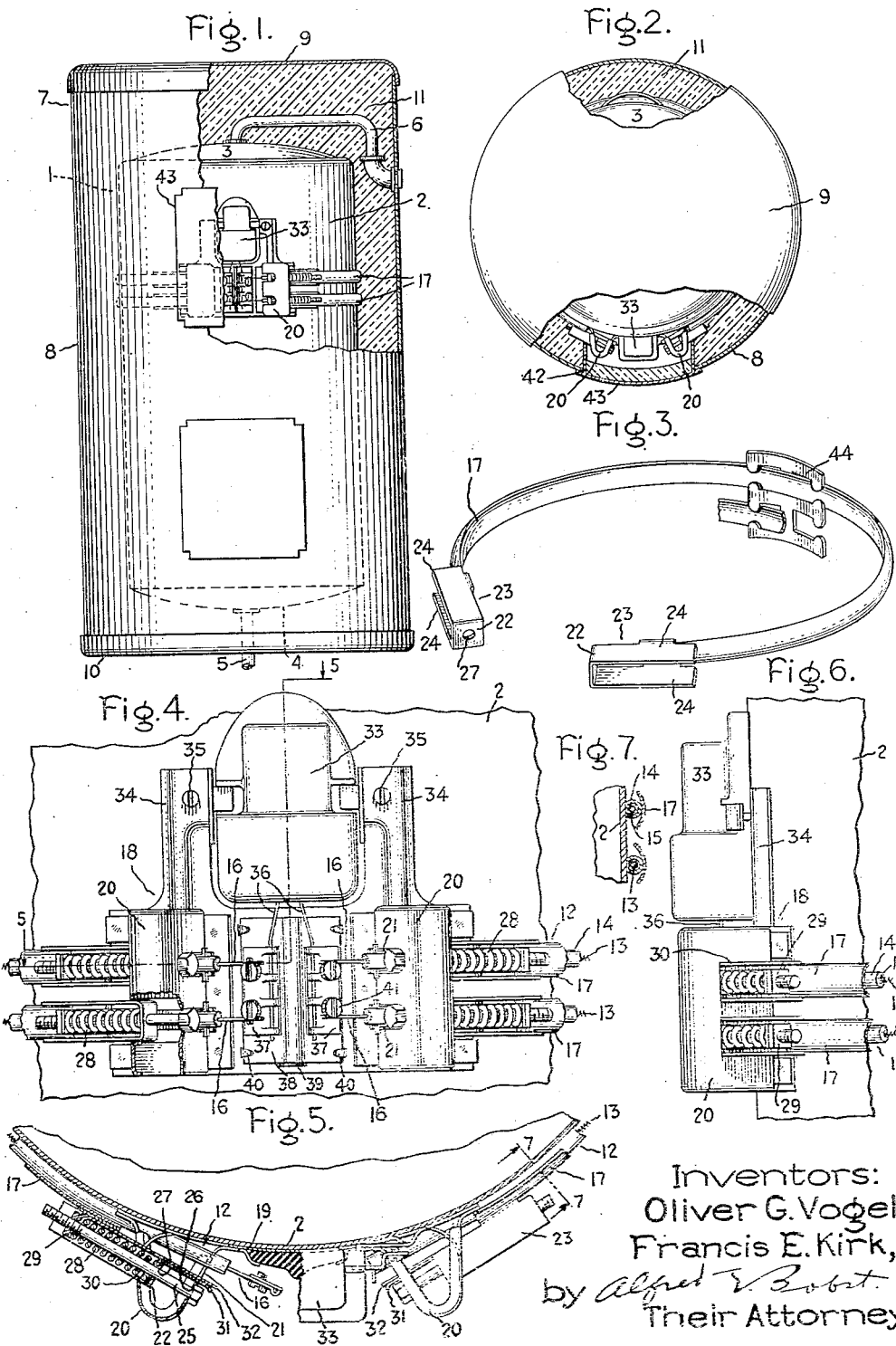
Inventors:
Oliver G. Vogel,
Francis E. Kirk,
by Alfred E. Robst
Their Attorney.

Patented Oct. 26, 1948

2,452,214

UNITED STATES PATENT OFFICE 2,452,214

CLAMP-ON ELECTRIC HEATER FOR WATER TANKS AND THE LIKE

Oliver G. Vogel and Francis E. Kirk, Oak Park, Ill., assignors to Hotpoint Inc., a corporation of New York Application November 19, 1945, Serial No. 629,450

11 Claims. (Cl. 219—38)

1

This invention relates to water heaters, more particularly to water heaters having a water heating tank, and it has for its object the provision of improved electrical heating means for applying heat to the tank.

More specifically, this invention relates to improved means for applying heat to an exterior wall of the tank by means of a heating unit having a sheathed rod-like heating element of the type wherein a resistance conductor is mounted within a metallic outer sheath and is embedded in and held in spaced relation with reference to the sheath by a compacted mass of electrically insulating and heat conducting material, such as magnesium oxide. And it contemplates an improved heating unit of this character including an organization of parts adapting it for ready assembly with the tank and for disassembly therefrom so that the parts can easily be repaired or replaced; and so that heating elements can easily be added to or withdrawn from the unit for the purpose of changing its wattage. In addition, it contemplates such an arrangement of parts wherein these results can be obtained even though the tank be enclosed by a layer of heat insulating material, such as glass wool, without the necessity of providing a tunnel through the layer for receiving the heating unit.

For a more complete understanding of this invention, reference should be had to the accompanying drawing in which Fig. 1 is a front elevation of a water heater embodying this invention, parts being broken away and shown in section so as to illustrate certain details of construction; Fig. 2 is a plan view of the heater shown in Fig. 1, parts being broken away so as to illustrate certain details of construction; Fig. 3 is a perspective view illustrating certain elements of the heating means arranged in accordance with this invention, the parts in this figure being drawn to a larger scale than the corresponding elements of Figs. 1 and 2; Fig. 4 is an enlarged fragmentary front elevation illustrating certain elements of the heating means arranged in accordance with this invention; Fig. 5 is a sectional view taken through the line 5—5 of Fig. 4, and looking in the direction of the arrows; Fig. 6 is a side view of the organization of elements shown in Fig. 4; and Fig. 7 is a sectional view taken through line 7—7 of Fig. 5 and looking in the direction of the arrows.

Referring to the drawing, this invention has been shown in one form as applied to an electric water heater comprising a water heating and storage tank 1 having a cylindrical side wall 2, and upper and lower dome-shaped heads 3 and 4. A cold water supply pipe 5 is connected with the tank through the lower head 4, while a hot water draw-off pipe 6 is connected with the tank through its upper head 3. The tank 1 is enveloped by a larger outer casing 7 having a cylindrical side wall 8 concentric with the side wall 2 and in spaced relation with it, and upper and lower heads 9 and 10 spaced from the tank heads 3 and 4. Mounted within the space between the tank 1 and the outer casing 7 is a suitable thermal insulating material 11, which preferably will be glass wool.

The tank 1 is provided with electrical heating means for applying heat to the exterior surface of the cylindrical side wall 2 which heating means comprises a flexible metallically sheathed rod-like heating element 12. In the specific embodiment of the invention illustrated, two of the heating elements 12 are arranged in the heating unit assembly, the two units being spaced vertically, as shown. It will be understood that but one heating element may be used, or that more than two elements may be used. Each heating element 12 comprises a helical resistance conductor 13 mounted within an elongated tubular metallic sheath 14 and embedded in and held in spaced relation with reference to the sheath by a compacted mass 15 of electrically insulating and heat conducting material such as magnesium oxide. This insulating material is loaded into the sheath in powdered form, and may be compacted to a hard dense mass in any suitable way as by elongating the sheath and reducing its diameter by swaging or rolling. The heating element 12 is sufficiently flexible so that it may be shaped into the form of an open ring, and it is contemplated that this ring will be placed around the cylindrical side wall 2 of the tank and will be clamped against it in good heat conducting relation. Extending from the ends of the sheath 14 are terminals 16, shown more clearly in Figs. 4 and 5, and which terminals have their inner ends electrically connected with the ends of the resistance conductor 13 and embedded in the insulating material 15 so as to be supported thereby, while their outer exposed ends are used to connect the resistance conductor 13 to an electrical supply source.

As shown more clearly in Fig. 7, the outer wall section of the sheath 14 is curved, while the inner wall section in contact with the side wall 2 of the tank is flattened; that is, the cross section of the sheath is such that the outer part is in the form of a circle while the inner part is flattened. This is for the purpose of increasing the thermal contact area between the heating element and the tank.

The heating element is held tightly against the tank wall 2 by means of a metallic flexible clamping band 17 which is shaped in the form of a broken ring, as shown in Fig. 3; that is the band also is open-ended as is the heating element 12. This band is arranged to be fitted around the heating element, as shown in the drawing, so that it fits against the outer curved surface of the sheath 14. The band has a curved cross section substantially complementary to this outer curved sheath surface.

The band 17 is fitted to the element 12 so that its ends are brought adjacent the corresponding ends of the heating element, and means are provided for drawing the band ends toward each other so as to pull the heating element tightly against the side wall 2—it being understood that the element is sufficiently flexible to permit it to be drawn in in this fashion. For this purpose, a metallic anchor member 18 is provided which is adapted to be placed against the side wall 2 between the band ends of the clamping band 17. This anchor member is provided with a base plate 19 (Fig. 5) which is of curved form complementary to the shape of the side wall 2 and which is arranged to be positioned against it as shown in this figure. Projecting outwardly from the two spaced ends of the plate 19 are brackets 20. Each of the brackets is of U-shape and it has its two legs flanged outwardly and secured to the base plate 19 in any suitable way as by welding. The two legs of each bracket are provided with aligned apertures 21 through which the ends of the heating element 12 extend into the space between the ears, as shown more clearly in Figs. 4 and 5.

The innermost of the two legs of the brackets 20 constitute abutments to which the ends of the clamping band 17 are anchored. As shown, the ends of the band are provided with abutments 22 which coact respectively with the abutments of the brackets 20 and which are located outside of these abutments, as shown more clearly in Fig. 5. The abutments 22 are formed on the ends of U-shaped elements 23, the abutments being the nexus of these elements and the members 23 further being provided with vertically spaced-apart legs 24. Anchoring bolts 25 are inserted through apertures 26 and 27 provided for them respectively in the bracket abutments and the abutments 22, as shown; and mounted on these bolts between the legs 24 of the clamping band are compression springs 28 having one end restricted by the band abutment 22 and the other end by nuts 29 adjustable on the bolts. It will be observed in view of this arrangement that the compression springs function to draw the two ends of the band 17 toward the bracket abutments and thereby tension the band so as to firmly press the flexible heating element against the side wall 2 of the tank. The nuts 29 are adjusted so as to give such thermal intimacy between the heating element and the tank that there is a good transfer of heat from the resistance conductors 13 to the contents of the tank. Because of this good heat transfer a relatively high wattage density heating element may be used.

The nuts 29 themselves are not turned in order to adjust them. On the contrary, they are proportioned so that they cannot turn between the two legs 24 of the members 23. Their adjustment is effected by turning the heads of the bolts 25, which of course are accessible between the brackets 20.

Preferably and as shown, the parts will be so arranged that the band abutments 22 will be positioned within the space between the two legs of their brackets 20, and for this purpose the outer legs of the brackets are provided with apertures 30 through which the abutment ends of the band are projected.

Indicating means are provided for adjusting the springs. The indicating means for each spring comprises an L-shaped tongue 31 (Fig. 5) which has its base arm bearing against the abutment 22 and its other arm extending outwardly through the opening 21 in the associated bracket so as to project into the space between the brackets. A similar but relatively elongated tongue 32 is provided which has its base arm bearing against the nut 29 and its under arm also extending through the associated bracket so as to project into the space between the brackets, and so that it overlaps the corresponding arm of the tongue 31, as shown. The relative positions of the indicator tongues 31 and 32, as may be seen in the space between the brackets, are an indication of the adjustment of the spring force.

The external electrical connections of the heaters 12 are made in the space between the two brackets 20, and where a controlling thermostat is provided this thermostat will be connected into the heater circuit within this space. In the embodiment of the invention illustrated a thermostat 33 is provided. The thermostat 33, as shown, is supported by the base 18 which has a pair of spaced-apart upwardly extending arms 34 arranged to support the thermostat, which element is secured to them by means of screws 35. The electrical connections 36 between the thermostat and the terminals 16 of the heater or heaters and between these elements and an external supply circuit are effected by means of connector plates 37 mounted in the space between the brackets 20 and which plates are spaced from plate 19 by an electrically insulating block 38 mounted upon the plate. As shown, block 38 is supported by a ledge 39 and is fastened by ears 40, the ledge 39 and the legs 40 being formed by lancing them outwardly from the material from which the base plate is made. Screws 41 function to make the electrical connections with the connector member 37.

It has been found that if the springs 28 be set so as to give the desired heat transfer effect between the heating elements 12 and the tank there is a tendency for the heating elements to grow. This is due to the fact that the band restricts and tends to prevent the contraction of the elements when they cool subsequently to a heating operation. As this action continues there is the danger that the sheath will rupture. To obviate this difficulty the contacting surfaces between the heating element and the tank and between the heating element and its band 17 are lubricated by means of a suitable lubricant. We have found that a colloidal graphite is suitable for this purpose. The lubricant reduces the frictional forces existing between the band and the heater and between the heater and the tank so as to permit these members to expand and contact substantially independently of each other and thereby it prevents growth of the heating unit.

The outer cylindrical side wall 8 of the outer casing is provided with an opening 42 opposite the anchor plate and its assembly of thermostat 33 and which normally is closed by an insulated door 43. It will be understood that when this door is opened access may be had for making connections to the heaters and for removing parts for replacement or repair. It will also be understood that if it be desired to remove one of the heating elements this may be accomplished by adjusting the nuts 29 so as to relieve the band tension, whereupon the heating element may be grasped at one end and pulled tangentially from the assembly; to replace it, it is merely necessary to insert one end into the space between one end of the band and the tank and push the element through until the other end of the element appears between the brackets 20. In each case the curved section of the band 17 acts to confine the heating element to its proper position. All of this may be done irrespective of the fact that there is an insulating layer 11 of glass wool about the tank. And it should be noted that the lubricant functions to facilitate the removal and insertion of the units.

Preferably and as shown, a separator 44 will be provided to hold the bands 17 in proper spaced relation at a point opposite the anchor member 18. This is important when a band is loosened to remove a unit or add a new one.

It will be understood that if the heater assembly be constructed for two or more heating elements 12 all of them need not be used, but one or more need not be inserted. In such case the associated band or bands 17 and other associated parts remain undisturbed. Then subsequently if it be desired to apply more heat to the tank it is merely necessary to add one or more of the heating elements 12 to the assembly. Thus, while an anchor plate accommodating two heating elements and retaining band assemblies has been shown for purposes of illustration, it will be apparent that a combination of three or more heating elements and accessory parts can be utilized.

The foregoing invention provides means for efficiently applying heat to the exterior wall surface of a water tank, together with means providing for ready assembly or disassembly of the operating parts for repair or replacement. It further provides means for quickly changing the heat generating capacity of the heating unit.

While one heating unit assembly has been shown at the top of the tank it will be understood that an identical one will usually be located at the bottom. In the cases where water heaters are constructed with only one heating unit, the heating unit assembly is located near the bottom of the tank.

While we have shown and described a particular embodiment of our invention, it will be obvious to those skilled in the art that various changes and modifications may be made without departing from our invention in its broader aspects and we therefore aim in the appended claims to cover all such changes and modifications as fall within the true spirit and scope of our invention.

What we claim as new and desire to secure by Letters Patent of the United States, is:

1. In a water heater having a water heating tank, electrical heating means for said tank comprising a rod-like flexible heating element for encircling said tank with its two ends spaced apart but adjacent each other, said element having a resistance conductor housed within a metallic sheath and an electrically insulating material insulating said conductor from said sheath, a flexible clamping band encircling said heating element with its ends spaced apart but adjacent each other, and adjustable resilient means interconnecting the ends of said band so as to draw them together and thereby force said heating element into good thermal relation with said tank and to permit relative expansion and contraction of said tank, heating element and band, said heating element being slidable with relation to said tank and band when said resilient means is adjusted to release the tension in said band so that the heating element can readily be withdrawn from and inserted into its working position with relation to said tank.

2. In a water heater having a water heating tank provided with a cylindrical side wall, a flexible metallically sheathed rod-like heating element encircling said tank with its two ends adjacent each other and spaced apart, said heating element having an outer curved wall and an inner wall contacting said cylindrical side wall, a flexible clamping band encircling said heater element with its two ends adjacent each other but spaced apart engaging said outer wall of said heating element and having a shape complementary thereto, and spring means drawing the ends of said band toward each other so as to force said heating element into good thermal contact with said side wall.

3. In a water heater having a water heating tank provided with a cylindrical side wall, a flexible metallically sheathed rod-like heating element encircling said tank with its two ends adjacent each other but spaced apart, said heating element having an outer curved wall and an inner flattened wall which contacts with said cylindrical side wall of said tank, a flexible clamping band encircling said heating element with its two ends adjacent each other but spaced apart and engaging said outer wall thereof and having a shape complementary thereto, and spring means interconnecting the ends of said band so as to draw them together and thereby force said flattened wall into good thermal contact with said cylindrical side wall.

4. In a water heater having a water heating tank provided with a cylindrical side wall, an open-ended flexible metallically sheathed rod-like heating element encircling said tank, said heating element having an outer curved wall and an inner flattened wall which contacts with said cylindrical side wall of said tank, an open-ended flexible clamping band encircling said heating element and engaging said outer wall thereof and having a shape complementary thereto, spring means interconnecting the ends of said band so as to draw them together and thereby force said flattened wall into good thermal contact with said cylindrical side wall, and means lubricating the contacting surfaces between said heating element and said tank side wall and between said heating element and said band so as to permit substantially unrestricted expanding and contracting motion between said members.

5. In a water heater having a heating tank provided with a cylindrical side wall, an electrical heating unit for applying heat to the exterior surface of said side wall comprising a heating element encircling said cylindrical side wall, a flexible band separate from and encircling said heating element so as to clamp it against said side wall, said band having its two ends adjacent each other, an anchor separate from said heating element and band positioned at the ends of said band and provided with a pair of abutments one for and adjacent to each end of said band and each band end having a mating abutment, and a pair of springs coacting with said sets of abutments respectively so as to draw said band ends toward said anchor and thereby force said heating element into good thermal contact with said cylindrical side wall.

6. In a water heater having a heating tank provided with a cylindrical side wall, an electrical heating unit for applying heat to the exterior surface of said side wall comprising a heating element encircling said cylindrical side wall, an open-ended flexible band encircling said heating element so as to clamp it against said side wall, an anchor separate from said heating element and band positioned at the ends of said band and provided with a pair of abutments one for and adjacent to each end of said band and each band end having a mating abutment, a pair of springs coacting with said sets of abutments respectively so as to draw said band ends toward said anchor and thereby force said heating element into good thermal contact with said cylindrical side wall, adjustable means for adjusting said springs to vary the forces applied thereby, and indicating means for indicating the settings of said adjustable means.

7. In a water heater having a heating tank provided with a cylindrical side wall, an open-ended flexible rod-like heating element encircling said side wall, an open-ended flexible clamping band encircling said heating element, the ends of said band being provided with outwardly extending abutments, an anchor member separate from said heating element and band having a pair of outwardly extending abutments located adjacent to and mating respectively with the two abutments of said ends, a pair of bolts extending through apertures provided for them in said sets of mating abutments respectively arranged with their heads engaging those on said anchor, adjusting nuts threaded on said bolts, and compression springs on said bolts between said nuts and the abutments on said band ends so as to draw said ends toward each other.

8. In a water heater having a heating tank provided with a cylindrical side wall, means for applying heat to said side wall comprising, a metallic anchor plate adapted to be positioned against said side wall, said plate having a pair of ears spaced apart transversely thereof, said ears having apertures therethrough lying in a common transverse plane, an open-ended flexible heating element lying in said plane encircling said side wall and having its ends extending through said apertures toward each other, terminals extending from said ends, an electrically insulating terminal block mounted on said plate between said ears, electrical connectors on said block connected to said terminals, a flexible open-ended clamping band encircling said heating element and having its two ends brought adjacent to said pair of ears respectively, and elastic means interconnecting said ends with said ears so as to draw said ends toward said ears and thereby clamp said heating element against said side wall and support the entire assembly of heating element, anchor plate, terminal block, and band to said tank.

9. In a water heater having a heating tank provided with a cylindrical side wall, means for applying heat to said side wall comprising, a metallic anchor plate adapted to be positioned against said side wall, said plate having a pair of ears spaced apart transversely thereof, said ears having apertures therefrom lying in a common transverse plane, an open-ended flexible heating element lying in said plane encircling said side wall and having its ends extending through said apertures toward each other, terminals extending from said ends, an electrically insulating terminal block mounted on said plate between said ears, a thermostat supported by said plate so as to be held in thermal contact with said side wall, electrical connectors on said block connecting said thermostat in the circuit of said heating element, a flexible open-ended clamping band encircling said heating element but having its two ends brought to points adjacent to said pair of ears respectively, and elastic means interconnecting said ends with said ears so as to draw said ends toward said ears and thereby clamp said heating element against said side wall and support the entire assembly of heating element, anchor plate, terminal block, thermostat and band to said tank.

10. In a water heater having a heating tank provided with a closed side wall, means for heating said tank comprising a flexible heating element encircling said side wall, an open-ended flexible clamp band encircling said heating element, an anchor plate, and means for attaching one end of said band to said plate so as to tension the band and thereby to clamp said heating element to said side wall, said means having a pair of coacting abutments on said anchor plate and band respectively, a bolt passed through aligned openings provided for it in said abutments so that the bolt head engages one of said abutments, a spring on said bolt interposed between a nut threaded thereon and the other of said abutments so that the spring biases said band end toward said anchor plate to tension the band, an indicator attached to said other abutment, and a second indicator positioned by said nut coacting with the first to give an indication of the nut position and thereby the setting of said spring.

11. In a water heater having a heating tank provided with a cylindrical side wall, an electrical heating element for applying heat to the exterior surface of said side wall comprising a heating element encircling said cylindrical side wall, an open-ended flexible band encircling said heating element so as to clamp it against said side wall, an anchor separate from said heating element and band positioned at the ends of said band provided with a pair of abutments one for and adjacent to each end of said band and each band end having a mating abutment, a pair of springs coacting with said sets of abutments respectively so as to draw said band ends toward said anchor and thereby force said heating element into good thermal contact with said cylindrical side wall, and a thermostat for controlling said heating element mounted on said anchor so as to be supported in thermal contact with said exterior surface.

OLIVER G. VOGEL.
FRANCIS E. KIRK.

REFERENCES CITED

The following references are of record in the file of this patent:

UNITED STATES PATENTS

| Number | Name | Date |
|---|---|---|
| 1,642,197 | Fowler | Sept. 13, 1927 |
| 2,075,686 | Wiegand | Mar. 30, 1937 |
| 2,237,151 | Knez | Apr. 1, 1941 |

FOREIGN PATENTS

| Number | Country | Date |
|---|---|---|
| 287,828 | Great Britain | Mar. 29, 1928 |